United States Patent [19]

Morgan et al.

[11] Patent Number: 4,465,090

[45] Date of Patent: Aug. 14, 1984

[54] AIR RELAY

[75] Inventors: Morris E. Morgan; William A. Morgan, both of Valencia, Calif.

[73] Assignee: Menco Manufacturing, Inc., Valencia, Calif.

[21] Appl. No.: 375,812

[22] Filed: May 7, 1982

[51] Int. Cl.³ .............................................. F16K 11/14
[52] U.S. Cl. ................... 137/102; 137/624.14
[58] Field of Search ................... 137/624.14, 119, 102, 137/627.5, 596.18

[56] References Cited

U.S. PATENT DOCUMENTS

| 2,760,511 | 8/1956 | Greeff | 137/624.14 X |
| 3,380,348 | 4/1968 | Kroffke | 137/624.14 X |
| 3,387,563 | 6/1965 | Williams et al. | 92/152 X |
| 3,857,411 | 12/1974 | Moon | 137/627.5 |
| 4,370,996 | 2/1983 | Williams | 137/99 |

Primary Examiner—Alan Cohan
Attorney, Agent, or Firm—Harris, Kern, Wallen & Tinsley

[57] ABSTRACT

An oscillating or timing valve, sometimes known as an air relay, suitable for use with a chemical injector. A valve housing with sliding poppet, sliding piston and adjustable needle, with the poppet movable in one direction to close an exhaust port and with the piston movable in the opposite direction to engage the poppet and close the outlet or drive port and open the exhaust port. The piston oscillates between the drive port open and the drive port closed conditions, with the timing adjusted by varying the needle orifice and the size of the chamber fed through the needle orifice. The oscillating valve does not utilize any diaphragms or springs.

8 Claims, 2 Drawing Figures

AIR RELAY

BACKGROUND OF THE INVENTION

This invention relates to valves and more particularly, to an oscillating valve or air relay suitable for use in operating chemical injectors and the like. A typical oscillating valve and its use with a chemical injector is shown in U.S. Pat. No. 3,387,563. In operation, a continuous supply of air or other gas under pressure is connected to the supply port of the valve, and a piston pump or other load is connected to the drive port. The oscillating valve functions automatically to periodically provide air under pressure at the drive port for actuating the load. The timing of the oscillatory action of the valve is adjustable, as by varying the orifice of a needle valve in a flow path between the drive port and a chamber within the valve.

The typical oscillating valve of the prior art uses one or more diaphragms and one or more springs to achieve the oscillatory action. Also, the supply pressure at which the prior art valves can operate is limited to about 65 psi. When it is desired to operate the load at a higher pressure, two valves have been operated in sequence.

It is an object of the present invention to provide a new and improved oscillating valve or air relay which does not require diaphragms or springs. It is another object of the invention to provide such a new and improved valve which can be operated at higher supply pressures, such as 200 psi. A further object of the invention is to provide such a valve which can be utilized in combination with an external accumulator to provide a wider range of operating frequencies. These and other objects, advantages, features and results will more fully appear in the course of the following description.

SUMMARY OF THE INVENTION

An oscillating valve with a poppet sliding in a poppet section of the valve housing, a piston sliding in a piston section of the housing, and a needle stem adjustably positioned in a needle section of the housing for varying the size of a needle orifice. The housing includes a supply port for connection to a supply of gas under pressure, a drive port for connection to a load, and an exhaust port. The poppet engages a first seat in the housing for blocking the exhaust port and engages a second seat in the piston for blocking flow between the supply port and the drive port. Passages within the housing provide appropriate flow paths, and seals on the poppet and piston provide appropriate seals, whereby gas pressure at the supply port moves the poppet to engage the housing seat and close the exhaust port, and moves the piston away from the poppet to permit flow from the supply port to the drive port, and whereby back pressure at the drive port through the needle orifice into a chamber at the piston moves the piston to engage the piston seat with the poppet blocking flow from the supply port to the drive port and move the poppet away from the housing seat permitting flow from the drive port to the exhaust port. The timing of the opening and closing can be varied by adjusting the needle in the needle orifice. In one embodiment, an external accumulator is connected to the chamber to provide a lower frequency of oscillation.

DESCRIPTION OF THE PREFERRED EMBODIMENTS

Figure 1:
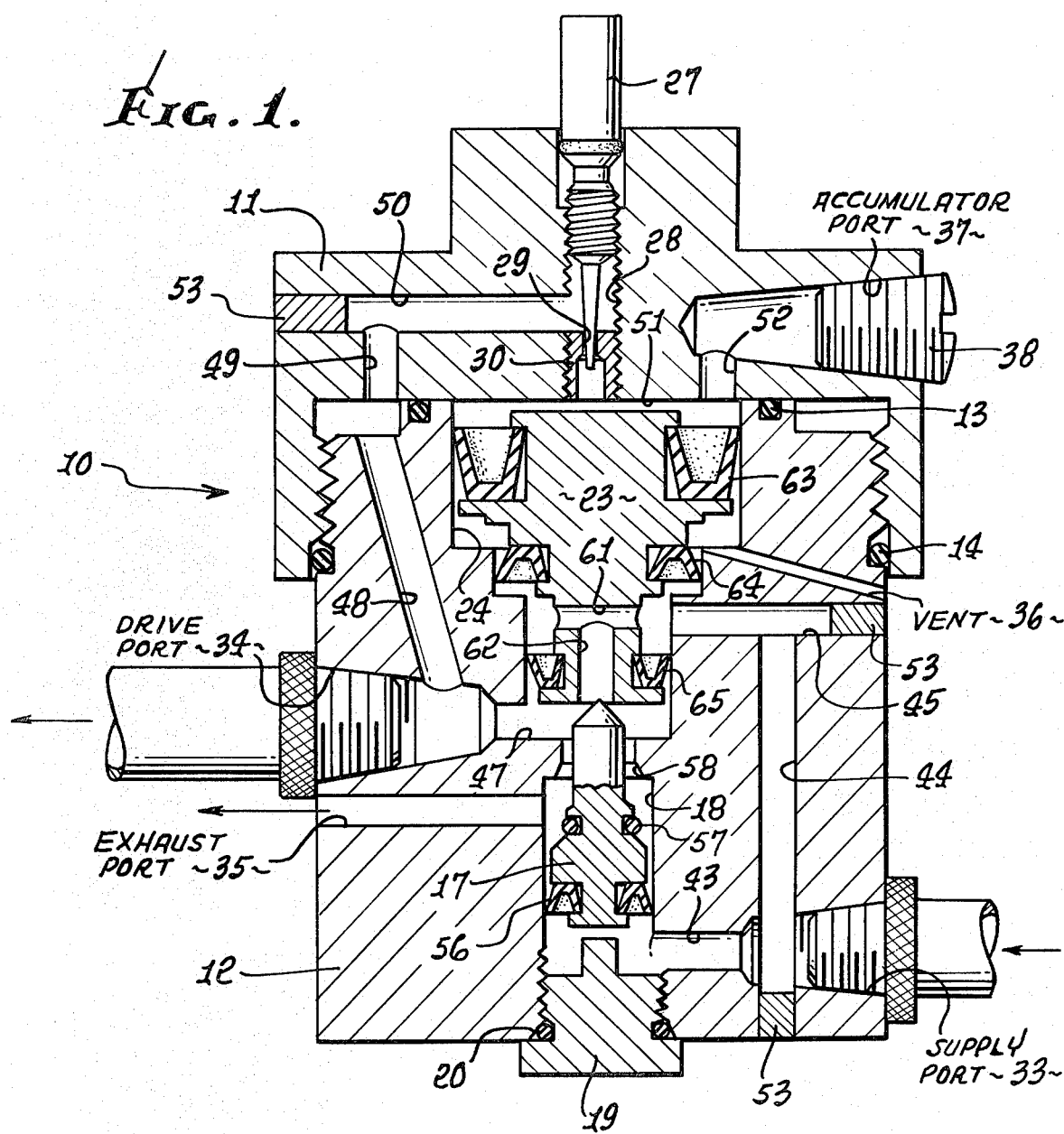
FIG. 1 is a sectional view through an oscillating valve incorporating the presently preferred embodiment of the invention.

The valve of FIG. 1 includes a housing 10 with a cap 11 threaded onto a body 12. O-ring seals 13, 14 are positioned between the cap and body.

A poppet 17 is positioned in a poppet section 18 of the body, and the poppet section is closed by a plug 19 and O-ring seal 20. A piston 23 is positioned in a piston section 24 of the body. A valve stem 27 is threaded into a correspondingly threaded needle section 28 in the cap 11, with the valve stem entering an orifice 29 in an insert 30 which is also threaded into the needle section 28.

Figure 2:
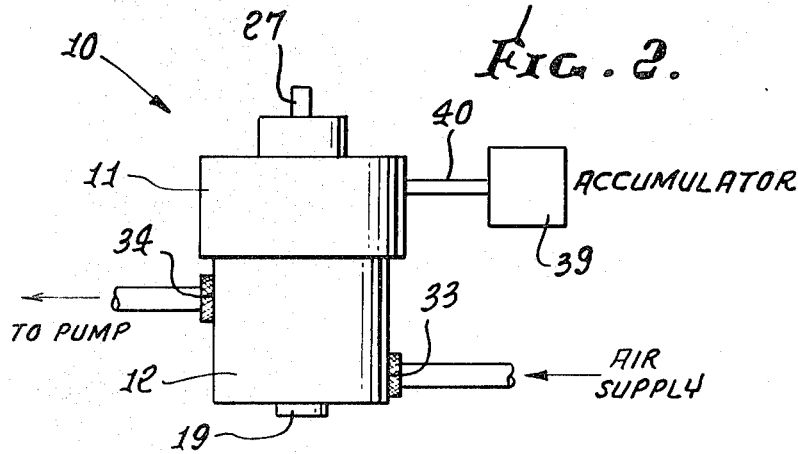
FIG. 2 is a diagram illustrating connection of the valve of FIG. 1 to an air supply, a pump and an accumulator.

A supply port 33, a drive port 34, and an exhaust port 35 are provided in the body 12. A vent line 36 provides for venting the central portion of the piston section 24 to the atmosphere. An accumulator port 37 in the cap 11 may be closed by a plug 38 or may be connected to an accumulator 39 by a line 40 (see FIG. 2).

A passage 43 in the body 12 provides a flow path between the supply port 33 and the poppet section 18. Passages 44 and 45 in the body 12 provide a flow path between the supply port 33 and the lower portion of the piston section 24. A passage 47 provides a flow path between the junction of the poppet section 18 and piston section 24, and the drive port 34. A passage 48 in the body 12 and passages 49 and 50 in the cap 11 provide a flow path from the drive port 34 through the orifice 29 into a chamber 51 in the piston section 24 above the piston 23. A passage 52 in the cap 11 provides a flow path between the chamber 51 and the accumulator port 37. Plugs 53 are used where appropriate for closing the passages.

A U-cup seal 56 is carried at the lower end of the poppet 17 for sealing engagement with the wall of the poppet section 18. An O-ring seal 57 is carried in the mid portion of the poppet 17 for sealing engagement at a seat 58 at the upper end of the poppet section 18.

A lateral passage 61 and an interconnecting axial passage 62 are provided in the piston 23. In the embodiment illustrated, the piston section 24 has three different diameters, and the piston 23 has three corresponding diameters, with U-cup seals 63, 64, 65 carried on the piston at each diameter respectively, for sealing engagement with the corresponding walls of the piston section.

In operation, a supply of air or other gas under pressure is connected to the supply port 33 and a load such as a piston pump is connected at the drive port 34. Pressure in the poppet section below the poppet moves the poppet upward, engaging the seal 57 with the seat 58 and closing the exhaust port 35. Air in the piston chamber above the seal 65, entering through the passages 44, 45 moves the piston upward and permits air flow through the passages 61, 62, 47 to the drive port 34. This condition continues until the piston pump or other load has been actuated and a back pressures builds up at the drive port 34. There is air flow into the chamber 51 through the passages 48, 49 and 50 and the orifice 29. The force on the upper end of the piston due to pressure in the chamber 51 increases until that force exceeds the force on the smaller diameter portion of the piston produced by the supply air, and the piston then moves downward. This downward movement of the piston brings a seat 70 at the lower end of the passage 62 into engagement with the upper end of the poppet 17, closing the flow path from the supply port to the drive port and shutting off air supply to the load. Continued downward movement of the piston also moves the poppet downward, moving the seal 57 away from the seat 58. This opens the exhaust port 35 and permits flow from the drive port through the passage 47, the poppet section 18 and the passage 46. The chamber 51 is also exhausted by reverse flow through the orifice 59, the passages 50, 49, 48, 47, the poppet section 18 and the passage 46.

The valve is now returned to the initial condition and is ready for another cycle of operation. The timing of the cycle, that is the number of oscillations per minute, can be adjusted by rotating the valve stem 27 to increase or decrease the size of the opening at the orifice 29. Also, the timing can be changed by changing the volume of the chamber 51 by connecting an appropriate volume accumulator 39 at the port 37. The accumulator can have a fixed volume or can have an adjustable volume as desired.

We claim:

1. In an oscillating valve, the combination of:
    a valve housing including means defining poppet, piston and needle sections, said poppet section including a first seat and said needle section including a needle orifice;
    a poppet slidably positioned in said poppet section;
    a piston slidably positioned in said piston section, said piston having a flow path therethrough with a second seat; and
    a needle stem adjustably positioned in said needle section for varying the size of said needle orifice;
    said housing including a supply port with a first passage to said poppet section and a second passage to said piston section, an exhaust port with a third passage to said poppet section, and a drive port with a fourth passage to said piston section and a fifth passage to said needle section;
    said poppet including a first sliding seal for sealing in said poppet section between said first and second passages;
    said piston including a second sliding seal for sealing in said piston section between said second and fourth passages, and a third sliding seal for sealing in said piston section between said second and fifth passages and defining a chamber between said piston and needle orifice;
    whereby gas pressure at said supply port moves said poppet to engage said first seat and close said exhaust port, and moves said piston away from said poppet to permit flow from said supply port to said drive port through said second passage, piston flow path and fourth passage, and
    back pressure at said drive port through said fifth passage and needle orifice into said chamber moves said piston to engage said second seat with said poppet and close said piston flow path blocking flow from said supply port to said drive port and move said poppet away from said first seat and permit flow from said drive port to said exhaust port through said fourth passage, poppet section and third passage,
    with the pressure at said supply port providing the sole force for moving said poppet toward said first seat and providing the sole force for moving said piston away from said poppet.

2. An oscillating valve as defined in claim 1 including a vent passage in said housing for said piston section between said second and third seals.

3. An oscillating valve as defined in claim 2 including a fourth sliding seal on said piston between said second and third seals, with said vent passage communicating with said piston section between said third and fourth seals.

4. An oscillating valve as defined in claim 3 wherein each of said seals is a U-cup seal.

5. An oscillating valve as defined in claim 1 wherein each of said seals is a U-cup seal.

6. An oscillating valve as defined in claim 1 wherein said housing includes an accumulator port with a sixth passage to said chamber.

7. An oscillating valve as defined in claim 6 including a volume accumulator connected at said accumulator port providing a predetermined increase in volume for said chamber.

8. An oscillating valve as defined in claim 1 wherein said piston includes a first portion of smaller cross-section area facing toward said poppet and a second portion of larger cross-section area facing toward said needle orifice.

* * * * *